US010281579B2

(12) United States Patent
Kern et al.

(10) Patent No.: US 10,281,579 B2
(45) Date of Patent: May 7, 2019

(54) METHOD OF OPERATING A CONFOCAL WHITE LIGHT SENSOR ON A COORDINATE MEASURING MACHINE

(71) Applicant: Carl Zeiss Industrielle Messtechnik GmbH, Oberkochen (DE)

(72) Inventors: Rudolf Kern, Aalen (DE); Jochen Burger, Koenigsbronn (DE); Kurt Brenner, Satteldorf (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 15/922,825

(22) Filed: Mar. 15, 2018

(65) Prior Publication Data

US 2018/0203119 A1   Jul. 19, 2018

Related U.S. Application Data (63) Continuation of application No. PCT/EP2016/071843, filed on Sep. 15, 2016.

(30) Foreign Application Priority Data

Sep. 15, 2015   (DE) .......................... 10 2015 217 637

(51) Int. Cl.
*G01S 17/42*   (2006.01)
*G01B 21/04*   (2006.01)
(Continued)

(52) U.S. Cl.
CPC ............ *G01S 17/42* (2013.01); *G01B 11/005* (2013.01); *G01B 21/042* (2013.01);
(Continued)

(58) Field of Classification Search
CPC ........ G01S 17/42; G01S 7/4816; G01S 7/534; G01B 11/005; G01B 21/042
(Continued)

(56) References Cited

U.S. PATENT DOCUMENTS 8,711,365 B2 * 4/2014 Christoph ............ G01B 21/045
33/503
2009/0056156 A1   3/2009 Hellstrom et al.
(Continued)

FOREIGN PATENT DOCUMENTS

DE   10340803 A1   3/2005
DE   102013105753 B3   10/2014
(Continued)

OTHER PUBLICATIONS

English-language translation of International Preliminary Report on Patentability of the European Patent Office in PCT/EP2016/071843 (from which this application claims priority) dated Mar. 20, 2018.
(Continued)

*Primary Examiner* — Roy M Punnoose
(74) *Attorney, Agent, or Firm* — Ewers & Hasselmann PLLC (57) ABSTRACT

A method for operating a confocal white light sensor on a coordinate measuring machine including a sensor carrier configured to couple a coordinate measurement sensor that is movable in a straight movement direction relative to a base of the coordinate measuring machine is provided. A confocal white light sensor is coupled to the sensor carrier and oriented in the straight movement direction toward a reference body. The sensor carrier and the reference body are moved relative to one another in the straight movement direction, and a measurement signal representing a distance between the confocal white light sensor and the reference body is generated at different movement positions. Information relating to a relationship between measurement signals of the confocal white light sensor and an actual distance of the white light sensor to a measurement object is obtained and a measurement value of the object distance is generated.

14 Claims, 4 Drawing Sheets

(51) Int. Cl.
*G01B 11/00* (2006.01)
*G01S 7/481* (2006.01)
*G01S 7/534* (2006.01)

(52) U.S. Cl.
CPC ............ *G01S 7/4816* (2013.01); *G01S 7/534* (2013.01); *G01B 2210/50* (2013.01); *G01B 2210/60* (2013.01)

(58) Field of Classification Search
USPC ........................................................ 356/614
See application file for complete search history.

(56) References Cited

U.S. PATENT DOCUMENTS

| | | | |
|---|---|---|---|
| 2012/0194651 A1* | 8/2012 | Kanto | G01B 11/00 348/50 |
| 2013/0314690 A1 | 11/2013 | Jones et al. | |
| 2014/0259715 A1 | 9/2014 | Engel | |
| 2016/0076867 A1 | 3/2016 | Ruck et al. | |
| 2018/0094975 A1* | 4/2018 | Marsaut | G01B 11/005 |

FOREIGN PATENT DOCUMENTS

| | | |
|---|---|---|
| JP | H07-120216 | 5/1995 |
| WO | 2013091697 A1 | 6/2013 |

OTHER PUBLICATIONS

E.-H. Nadim et al., Comparison of Tactile and Chromatic Confocal Measurements of Aspherical Lenses for Metrology, International Journal of Precision Engineering and Manufacturing, vol. 15, No. 5, May 2, 2014, pp. 821 to 829.

International Search Report of the European Patent Office in PCT/EP2016/071843 (from which this application claims priority) dated Dec. 15, 2016 and English-language translation thereof.

\* cited by examiner

METHOD OF OPERATING A CONFOCAL WHITE LIGHT SENSOR ON A COORDINATE MEASURING MACHINE

CROSS REFERENCE TO RELATED APPLICATIONS

This application is a continuation application of international patent application PCT/EP2016/071843, filed Sep. 15, 2016, designating the United States and claiming priority to German application 10 2015 217 637.1, filed Sep. 15, 2015, and the entire content of both applications is incorporated herein by reference.

TECHNICAL FIELD

The invention relates to a method for operating a confocal white light sensor on a coordinate measuring machine and to an arrangement having a coordinate measuring machine and a confocal white light sensor.

BACKGROUND

The use of coordinate measuring machines (CMM) for measuring coordinates of a workpiece surface of at least one workpiece is known. The workpiece surface is scanned with at least one sensor of the CMM, specifically by way of tactile probing of the workpiece surface using a probe, and/or in a contactless manner. Contactless scanning sensors include optical sensors. Laser triangulation sensors are a type of optical sensors. Confocal white light sensors are another type of optical sensors. Their use as sensors of coordinate measuring machines is known, e.g., from DE 103 40 803 A1.

A coordinate measuring machine is a machine that can measure coordinates of a workpiece using at least one sensor. The present invention specifically relates to coordinate measuring machines that can measure coordinates of surfaces and/or material boundary surfaces of workpieces. The present invention furthermore specifically relates to coordinate measuring machines having a movement apparatus that permits a relative movement of the sensor and of the workpiece. One possibility for moving the sensor and the workpiece relative to one another is offered by CMMs having one or more sensors that are movable relative to a base at rest. Examples are coordinate measuring machines having a portal design or a gantry design. The workpiece to be measured is typically placed directly onto the base at rest, e.g., a measurement table, or by a workpiece holder (e.g. a rotary table) on the base. Another possibility for a relative movement of sensor and workpiece is offered by coordinate measuring machines having a movable measurement table and a fixed sensor, e.g., CMMs having a XY measurement table, which is movable in two movement directions that are perpendicular to one another. As is shown by the example of the CMM with a portal design or gantry design having a rotary table, mixed forms of both types of CMM are possible, i.e., the relative movement can be brought about both by a movement of the sensor and by a movement of the workpiece relative to a base at rest. A further such mixed form is realized, e.g., by the O-INSPECT production series from Carl-Zeiss Industrielle Messtechnik GmbH, Oberkochen, Germany. The workpiece is placed on a movable XY measurement table. However, the sensor is additionally movable in the vertical direction (Z-direction). The invention relates in particular to all these types of CMM.

A confocal white light sensor is a sensor that uses the principle of chromatic confocal distance measurement. White light (i.e., electromagnetic radiation, not necessarily visible, having radiation components of a plurality of wavelengths) is radiated by a light source onto a focusing optical unit. The focusing optical unit effects dispersion of the radiation, i.e., chromatic aberration occurs. As a result, the radiation components of the different wavelengths are focused at different distances to the focusing optical unit. If an object that reflects radiation back in the direction of the sensor is located in the respective focus (focal point or focal line), the sensor detects radiation of the wavelength with maximum intensity that was back-reflected in the focus. It is also possible that radiation of different wavelengths is back-reflected at the same time at their respective foci. In that case, the sensor detects in each case a (local) intensity maximum at these wavelengths. If the distance from the focus to the sensor (e.g., to the focusing optical unit) is known, it is possible to ascertain the distance between the sensor and the workpiece surface from the wavelength of the single intensity maximum or from the wavelengths of the intensity maxima. However, this knowledge does not initially exist and is generally obtained by way of a reference measurement, in which the distance between the sensor and the reflection location is also measured in a different manner, e.g., by using a laser interferometer.

United States Patent Application Publication No. 2016/0076867 describes the automatic receiving of white light sensors of a coordinate measuring machine. A movable part of the coordinate measuring machine and the white light sensor each have an interchange interface for coupling the white light sensor to a carrier structure of the coordinate measuring machine. Consequently, various sensors can be operated successively at the interchange interface of the CMM.

White light sensors are typically combined with a signal processing unit that processes the signals of the white light sensor. In particular, evaluation of the signals of the white light sensor takes place in the signal processing unit, which means that the unit is an example of an evaluation device. If the above-mentioned knowledge about the distance of the focus in each case for the individual wavelength components of the white light is available to the evaluation device, the evaluation device can also ascertain the actual distance of reflective surfaces and material boundary surfaces at the transition between different materials from the sensor signals. The white light sensor and the evaluation device are typically connected together using a fiber-optic cable, i.e., the signal supplied by the white light sensor is the radiation that is received by the sensor, in particular reflected by a workpiece. This has the advantage that heat produced during operation of the evaluation device is not produced at the location of the white light sensor. The white light can also be transferred from the light source to the location of the focusing optical unit of the white light sensor via a fiber-optic cable. In more general terms, a light guide is used for the radiation received by the white light sensor and/or for the white light from the light source. As already mentioned, the white light does not have to be, or does not have to be completely, in the visible wavelength range. When using a light guide, at least parts of the sensor system that measures the distance between the sensor and the workpiece are therefore not situated at the location of the focusing optical unit, which is also the location where the reflected radiation is received. In particular when using a white light sensor on a CMM having a movement device that moves the sensor relative to a base at rest, it is possible for the movable white light sensor to merely have the focusing optical unit that also receives the reflected radiation and has, e.g., an interface with or a fixed connection to a light guide. Parts of the light guide and the evaluation device (and the light source, to the extent that it is not part of the movable sensor) can be stationary with respect to the base. The sensor can therefore also be referred to as a sensor head of the sensor system.

As mentioned, the knowledge of the distance of the focus to the sensor must be obtained for every wavelength or frequency of the measurement radiation of the sensor, i.e., for every component of the white light that is to be used for the distance measurement. It would be possible in theory for this knowledge to be obtained by precisely taking account of the optical properties of the focusing optical unit of the sensor. The focus distances could be calculated therefrom. However, this is not practical due to manufacturing tolerances. The optical properties of the focusing optical unit can also depend on the operating conditions, in particular on the temperature. In practice, the knowledge of the wavelength-dependent focus distance is therefore already obtained at the site of the manufacturer of the sensor by way of a reference measurement: For a large number of distances between the sensor and a reference body, which reflects the measurement radiation back onto the sensor, first the measurement signals of the sensor are obtained and recorded and/or evaluated, and, in addition, the distance between sensor and reference body is measured in an additional distance measurement of a different distance measurement system. This makes it possible in particular for linearization parameters to be determined, with which linearization parameters it is possible to ascertain for an object distance of varying size function values of a linear mathematical function of the measurement value (i.e., of the measurement result of the sensor) depending on the object distance based on measurement signals of the confocal white light sensor. In simplified terms, the linearization parameters allow the measurement signals of the sensor (which reproduce in particular the intensity distribution of the reflected light received by the sensor over the wavelength range of the measurement radiation) to be converted into distance measurement values of the object distance such that, for twice the object distance, twice the measurement value of the object distance is also obtained. These measurement values of the object distance obtained can then be output by the evaluation device. During the measurement operation of the sensor, the user, or a measurement processing device that is connected to the evaluation device, therefore obtains merely the measurement values obtained by way of the knowledge of the focus distance. The primary measurement signals of the sensor are typically not output from the sensor system during the normal measurement operation.

Confocal white light sensors are highly resolving, and accurate distance sensors as compared to other distance sensors (such as capacitive sensors). By way of example, white light sensors having a maximum resolution of a hundredth of a micrometer and measurement regions in the order of magnitude of several tenths of millimeters to several tens of millimeters are available on the market. One example of this is the confocal white light sensor with the type designation "Confocal IDT IFS 2405" from Micro-Epsilon Messtechnik GmbH and Co. KG, Ortenburg, Germany.

If white light sensors, as described in United States Patent Application Publication No. 2016/0076867, can be interchanged on a coordinate measuring machine via an interchange interface such that they are available for use on the CMM, their operation necessitates the exact knowledge of the focus distance. However, as has likewise already been mentioned, it is advantageous to locally decouple the evaluation device and/or the light source from the white light sensor (i.e., from the measuring head). Only the white light sensor is arranged on the CMM by the interchange interface. Interchanging of a white light sensor therefore results in an operational state only if the evaluation device and/or light source is also present at a suitable location of the CMM or in the vicinity thereof and is connected to the sensor by a light guidance. However, the knowledge of the focus distance or the corresponding parameters that have been provided by the manufacturer of the sensor are in any case valid as regards the measurement accuracy and reproducibility of the measurement stated by the manufacturer only if the sensor system is in the same overall state as it was during the reference measurement at the site of the sensor manufacturer. Even if the evaluation device and/or the light source is not changed and, e.g., remains mounted on the CMM for a prolonged period of time, while the sensor is decoupled from the CMM and then again coupled to it, this can change the operating state of the white light sensor system. In particular, the light guide can be attached at the interface to the sensor and/or to the evaluation device and/or light source in a position and orientation that is changed slightly but influences the light and/or signal transmission. Furthermore, white light sensors having different measurement regions and different focus distances exist.

SUMMARY

It is an object of the present invention to provide a method for operating a confocal white light sensor on a coordinate measuring machine, which simplifies the operation of a confocal white light sensor on the coordinate measuring machine with high measurement accuracy. The intention in particular is to make it possible for different confocal white light sensors to be operated on the coordinate measuring machine in a simple manner and with a high measurement accuracy. It is a further object of the present invention to provide a corresponding arrangement having a coordinate measuring machine and a confocal white light sensor.

In accordance with a fundamental idea of the present invention, measurement signals of distances to a reference body are generated by the confocal white light sensor that is coupled to the coordinate measuring machine (CMM), an associated distance between the white light sensor and the reference body is measured in each case for the measurement signals by the position measurement system of the coordinate measuring machine, and the knowledge of the focus distance of the white light sensor is obtained therefrom. Obtaining this knowledge while the white light sensor is coupled to the CMM has the advantage that the knowledge exactly corresponds to the operating state of the white light sensor system that also exists during the measurement of workpieces using the white light sensor on the CMM. Changes in the operating state of the white light sensor system that result in a change in the measurement signals for the same object distance between sensor and measurement object (workpiece or reference body) are therefore taken into consideration. In addition, the positions of the sensor and of the reference body, or at least the distance between them, is/are measured in a simple manner by the position measurement system of the CMM, which is already present. Since the position measurement system of the CMM is also used when measuring a workpiece that is not the reference body, the knowledge of the focus distance is obtained based on position measurement data and/or distance measurement data of the same position measurement system, and consequently has a high accuracy. In any case, the accuracy of the position measurement can likewise be at least as high as during the measurement of a workpiece by the white light sensor that is coupled to the CMM. In particular, the CMM can be operated during the measurement of the reference body by the white light sensor to obtain the knowledge of the focus distance in a manner such that the accuracy of the measurements by the position measurement system of the CMM is better than when the white light sensor is measuring another workpiece. This can be achieved, e.g., by the confocal white light sensor and the reference body being moved more slowly and/or in an expedient manner in relation to one another. Slower movements, movements at a lower speed, lower accelerations and/or lower jerk can result in more precise position measurement values. In particular, the displacement of a movable part of a CMM along a machine axis with simultaneous blocking of other degrees of freedom of movement can furthermore result in particularly precise position measurement values with respect to the movement axis. In a coordinate measuring machine with a portal design, it is possible, e.g., for the relative movement of the confocal white light sensor and of the reference body in cascaded movement axes to take place, for example, along the movement axis that is the first movement axis as seen from the base. Accordingly, the parts of the CMM that are movable with respect to the further movement axes and via which the sensor is coupled to the base of the CMM are not moved during the reference measurement.

If the state of the white light sensor system has changed or could have changed, e.g., due to ageing or an external action (e.g. an impact), it is possible to perform a reference measurement on the CMM with little complexity. Reference measurements of the white light sensor using the reference body can also be performed repeatedly by the CMM. As opposed to shipping the white light sensor system to the manufacturer or to a calibration laboratory, the complexity of a reference measurement on the CMM is significantly lower.

In particular, the following is proposed: A method for operating a confocal white light sensor on a coordinate measuring machine that has a sensor carrier for coupling a coordinate measurement sensor that is movable in a straight movement direction relative to a base of the coordinate measuring machine, wherein a) the confocal white light sensor is coupled to the sensor carrier, b) the confocal white light sensor is oriented in the straight movement direction toward a reference body, wherein a position of the reference body with respect to the straight movement direction is known or ascertained, c) the sensor carrier with the confocal white light sensor that is coupled thereto and the reference body are moved relative to one another in the straight movement direction, and a measurement signal of a distance of the confocal white light sensor to the reference body is generated in each case at different movement positions by the confocal white light sensor, and in each case the movement position with respect to the straight movement direction is ascertained by a position measurement system of the coordinate measuring machine, d) information relating to a relationship between measurement signals of the confocal white light sensor and an actual distance of the white light sensor to a measurement object is obtained based on the generated measurement signals of the distance of the confocal white light sensor to the reference body and on the basis of the ascertained movement positions, e) at least one measurement signal of an object distance to a measurement object that is to be measured by the coordinate measuring machine is generated by the confocal white light sensor that is coupled to the sensor carrier, said measurement object that is to be measured not being the reference object, and f) a measurement value of the object distance is generated from the at least one measurement signal of the object distance using the obtained information relating to the relationship.

Step a) can alternatively be carried out at the site of the manufacturer of the CMM (e.g. as what is known as a fixed installation of the sensor) or at the site of the user of the CMM.

Furthermore, an arrangement is provided having a coordinate measuring machine, a confocal white light sensor and a reference body, wherein:

the coordinate measuring machine has a sensor carrier for coupling a coordinate measurement sensor that is movable in a straight movement direction relative to a base of the coordinate measuring machine, the coordinate measuring machine has a controller that is configured to move the confocal white light sensor, which is oriented in the straight movement direction toward the reference body and is coupled to the sensor carrier, and the reference body in the straight movement direction relative to one another to different movement positions, the coordinate measuring machine has a position measurement system that is configured to ascertain the movement position with respect to the straight movement direction, the confocal white light sensor is configured to generate in the different movement positions in each case a measurement signal of a distance of the confocal white light sensor to the reference body, the arrangement has an evaluation device that is configured to obtain information relating to a relationship between measurement signals of the confocal white light sensor and an actual distance of the white light sensor to a measurement object based on the generated measurement signals of the distance of the confocal white light sensor to the reference body and based on the ascertained movement positions, and the evaluation device and/or the controller of the coordinate measuring machine is/are configured to generate, using the obtained information relating to the relationship, a measurement value of the object distance from at least one measurement signal of the confocal white light sensor that is coupled to the sensor carrier, wherein the measurement signal corresponds to an object distance of the confocal white light sensor to a measurement object that is to be measured by the coordinate measuring machine and wherein the measurement object that is to be measured is not the reference object.

The movement in the straight movement direction is in particular the above-mentioned expedient movement by way of which the position measurement system of the CMM can generate particularly accurate position measurement values.

The sensor carrier to which the confocal white light sensor is coupled/is being coupled is in particular a sensor carrier which is provided, e.g., at a quill of a CMM with a portal design or with a gantry design, the sensor carrier being known in the field of coordinate measuring technology. As will be discussed below in more detail with reference to an exemplary embodiment, the sensor carrier can have an interchange interface, which means that the confocal white light sensor and optionally another sensor can be coupled to the sensor carrier via the interchange interface. The other sensor can be, e.g., a different confocal white light sensor. However, coupling the sensor to the sensor carrier is also understood to mean the one-time coupling, e.g., at the site of the manufacturer of the CMM such that the sensor remains permanently coupled to the sensor carrier during operation of the CMM at the site of the user of the CMM.

In principle, the reference body can be any suitable reflective body. Reference bodies are known in particular from the above-described reference measurement by the sensor manufacturer. Well-suited for a reference measurement are glass bodies, e.g., plate-shaped glass bodies having opposite surfaces that are parallel with respect to one another. In this case, the white light produced by the white light sensor is reflected in the direction of the sensor both at the front side and at the rear side of the glass body. This generates measurement signals for the measurement state in which both the front surface and the rear surface of the glass body are located in a focus distance to the sensor, i.e., at the two focus distances, measurement radiation with a local intensity maximum is in each case reflected back in the direction of the sensor. For parallel, in particular planar surfaces of the glass body at the opposite sides, the measurement radiation is radiated by the white light sensor preferably perpendicularly to the opposite surfaces or in an angular range with respect to the surface normal at a specified angle of incidence that is in particular so small that the reflected radiation is reflected back again onto the sensor with high radiant flux density and is captured thereby. The glass body can be made of any type of suitable glass, in particular also plastic glass.

Due to the straight relative movement between the white light sensor and the reference body, in particular in the direction of a movement axis of the CMM, the link (i.e., the relationship) between the measurement signal of the white light sensor and of the object distance can be recorded for different values of the distance in a simple manner and with particular accuracy.

This link can furthermore be recorded, if required, before and/or after the measurement of a workpiece by the white light sensor that is coupled to the CMM. As a result, precise results for the relationship between the measurement signals and the actual distance are provided. In particular, the white light sensor can remain permanently coupled to the sensor carrier of the CMM between the reference measurement performed by the CMM (steps b) to d), see above) and the measurement of the measurement object that is to be measured by the CMM. Consequently, the results of the reference measurement are reliably valid for the measurement of the measurement object.

In particular, as discussed above with reference to an exemplary embodiment, the information relating to the relationship between measurement signals of the confocal white light sensor and an actual distance of the white light sensor to a measurement object can have linearization parameters, with which linearization parameters for an object distance of varying size function values of a linear mathematical function of the measurement value in dependence on the object distance on the basis of measurement signals of the confocal white light sensor are ascertained. With linearization parameters of this type, it is possible for the white light sensor system to provide the user and/or other devices of the CMM with measurement values that are proportional to the object distance, at any rate within a measurement region for which the linearization parameters are valid.

The information relating to the relationship between measurement signals of the confocal white light sensor and an actual distance of the white light sensor to a measurement object can be stored in a data memory to which an evaluation device that is combined with the confocal white light sensor has access, wherein the evaluation device receives the measurement signal of the object distance and generates therefrom the measurement value of the object distance. In particular, the data memory can be part of the coordinate measuring machine, such that when different white light sensors that are coupled to the CMM are used, the respective evaluation device can access the information in the data memory and can utilize the information to produce the measurement value of the object distance. Alternatively or additionally, the CMM can have a single evaluation device that in each case receives the measurement signals of the white light sensor during operation of different white light sensors that are coupled to the CMM and, using the information relating to the relationship between measurement signals of the confocal white light sensor and an actual distance of the white light sensor to a measurement object, generates the measurement value or values of the object distance. In all these cases, a CMM of this type has the advantage that there is no need for the entire system of the white light sensor to be interchanged if a different sensor or a different white light sensor is operated on the CMM. In particular, the signal processing unit that receives the measurement signals of the object distance from the white light sensor can remain a permanent part of the CMM. This also permits in particular the replacement of a defective white light sensor with one of the same type, without having to replace further system components of the sensor system.

The obtained information relating to the relationship between measurement signals of the confocal white light sensor and an actual distance of the white light sensor to a measurement object typically also contains effects of systematic errors during the signal transmission of the measurement signals of the confocal white light sensor to an evaluation device. In particular, if the white light sensor is connected to the light source and/or the evaluation device by a light guidance, such systematic errors are also captured by the reference measurement and can also be taken into consideration, e.g., by way of linearization parameters. Systematic errors can occur, e.g., by interfaces between the light guide, on the one hand, and the light source and/or the evaluation device, on the other. The systematic error can also change while the light guide is being coupled and decoupled. The light guide can be made in particular of a plurality of sections that are connected, via in each case one interface, to an adjoining section of the light guide, the white light sensor or the evaluation device. It is possible, for example, to releasably connect such sections to one another at the interface via one plug connection in each case. This also makes it possible to replace individual sections, for example, if a section has been damaged. It is possible for a contribution to the systematic error to arise at the at least one interface, in particular, by way of absorption and/or reflection of radiation. This affects in particular the offset of the linear mathematical function with which the relationship between the measurement signals of the confocal white light sensor and the object distance is describable as a mathematical model. The offset can be corrected in a manner known per se using a dark correction.

The sensor carrier of the CMM can have an interface via which different confocal white light sensors can be optionally coupled to the sensor carrier, wherein at least the steps a) to e) in the above-mentioned list are performed in each case for different ones of the confocal white light sensors that are successively coupled to the sensor carrier. Step f) can also be performed for each of the different confocal white light sensors, i.e., measurement values of measurement objects that are not the reference body are also generated with each sensor. The interface of the sensor carrier facilitates the coupling and decoupling of white light sensors.

Each of the different confocal white light sensors may have a sensor interface for coupling to the interface of the sensor carrier, wherein each of the different confocal white light sensors has an individual identification feature that is automatically capturable by a controller of the CMM and/or of the white light sensor and that distinguishes the white light sensor from all other confocal white light sensors, and the controller captures the individual identification feature of a confocal white light sensor that is coupled to the interface of the sensor carrier and assigns to the confocal white light sensor that is coupled thereto information relating to a relationship between measurement signals of the confocal white light sensor and an actual distance of the white light sensor to a measurement object that was obtained for the coupled confocal white light sensor. In this way, the associated information is assigned in a simple manner by recognizing the individual identification feature. In particular, the information for each of the white light sensors that can be coupled to the CMM can be stored in the aforementioned data memory. Consequently, retrieving the information is simple. The identification feature can be, e.g., an optical identification feature that is captured by a further optical sensor (e.g., camera) of the CMM. Alternatively or additionally, the identification feature can be represented by digital, computer-readable data that are stored in a corresponding data memory of the confocal white light sensor and are read from the white light sensor via a data interface. The identification feature can also alternatively or additionally be implemented in a different manner.

In the reference measurement, in particular in step c) of the above-mentioned list, measurement signals of at least two different distances of the confocal white light sensor to at least two different surface regions of the reference body can be generated in each case by the confocal white light sensor at different movement positions of the confocal white light sensor relative to the reference body. In particular in step d) of the above-mentioned list, the information relating to a relationship between measurement signals of the confocal white light sensor and an actual distance of the white light sensor to a measurement object can be obtained based on the generated measurement signals of the at least two different distances and based on the ascertained movement positions. By capturing the two different distances to the reference body, redundant information is obtained that is advantageous in ascertaining the relationship between the measurement signals of the white light sensor and the object distance. By way of example, it is possible to ascertain the thickness of the reference body between the two different distances. With constant operating conditions, it may be assumed that the thickness remains constant over time, and therefore in each case the same thickness, i.e., the same position difference between the reflection locations, exists for different relative positions of the white light sensor and of the reference body. This redundant information increases the accuracy and reliability during the ascertainment of the relationship between the measurement signals and the object distance. It is likewise feasible for a reference body to have not just two, but more than two reflection locations at which measurement radiation from the white light sensor is reflected to it at the same time, i.e., if a material transition between two materials having different optical properties is located in the reference body.

Alternatively or additionally, a thickness measurement can be performed by the white light sensor during the measurement of a workpiece to be measured by the CMM, said workpiece not being the reference body.

In particular, the evaluation device can be part of a control unit that controls an operation of the confocal white light sensor. By way of example, the control unit can correct the measurement signals of the white light sensor by parts that are not due to the reception of reflected radiation of the measurement object, and/or control the duration and/or repetition of a measurement. The control unit can optionally be part of the controller of the CMM and/or be connected to the movement controller of the CMM, which controls the relative movement of sensor carrier and measurement object. In particular, the control unit can in this way also influence the relative movement. By way of example, a relative movement can take place only if the control unit enables the movement after a measurement by the white light sensor at an instantaneous relative position with respect to the measurement object has concluded. The mentioned correction of signal parts that cannot be linked to the reception of reflected radiation of the measurement object can be performed, e.g., as what is known as a dark correction, i.e., capturing and evaluating measurement signals of the white light sensor while no reflected radiation is received by the white light sensor. These signal components are in particular due to the reflection of radiation within the light guidance and at interfaces of the light guidance or by sections of the light guidance. The correction thus takes into account in particular the above-mentioned systematic errors.

This permits the following procedure: After the confocal white light sensor is coupled to the sensor carrier, information relating to the relationship between measurement signals of the confocal white light sensor and the actual distance of the white light sensor to a measurement object is obtained based on the generated measurement signals of the distance of the confocal white light sensor to the reference body and based on the movement positions ascertained by the position measurement system. Since this relationship can change when the connection of the confocal white light sensor to the evaluation device when a light guidance is changed, it is common not to change the connection between the measurement of the distance of the confocal white light sensor to the actual measurement object and the obtaining of information relating to the relationship between measurement signals of the confocal white light sensor and the actual distance of the white light sensor to a measurement object. The information relating to the relationship can be obtained before, during, and/or after the measurement of the distance to the measurement object. In particular, the connection is not changed in the sense that no interface between parts of the connection (for example between sections of the light guidance means) is separated, not even if the connection between the same parts is restored (for example by once again plugging together a plug connection). Even if the same parts are reconnected, this can affect the systematic error that arises when the confocal white light sensor is supplied with measurement radiation and during the transport of the reflected radiation to the evaluation device.

However, if the connection is changed, information relating to the relationship between measurement signals of the confocal white light sensor and the actual distance of the white light sensor to a measurement object are obtained once again and taken into account in a measurement of a measurement object with the white light sensor.

BRIEF DESCRIPTION OF THE DRAWINGS

The invention will now be described with reference to the drawings wherein.

DESCRIPTION OF EXEMPLARY EMBODIMENTS

Figure 1:
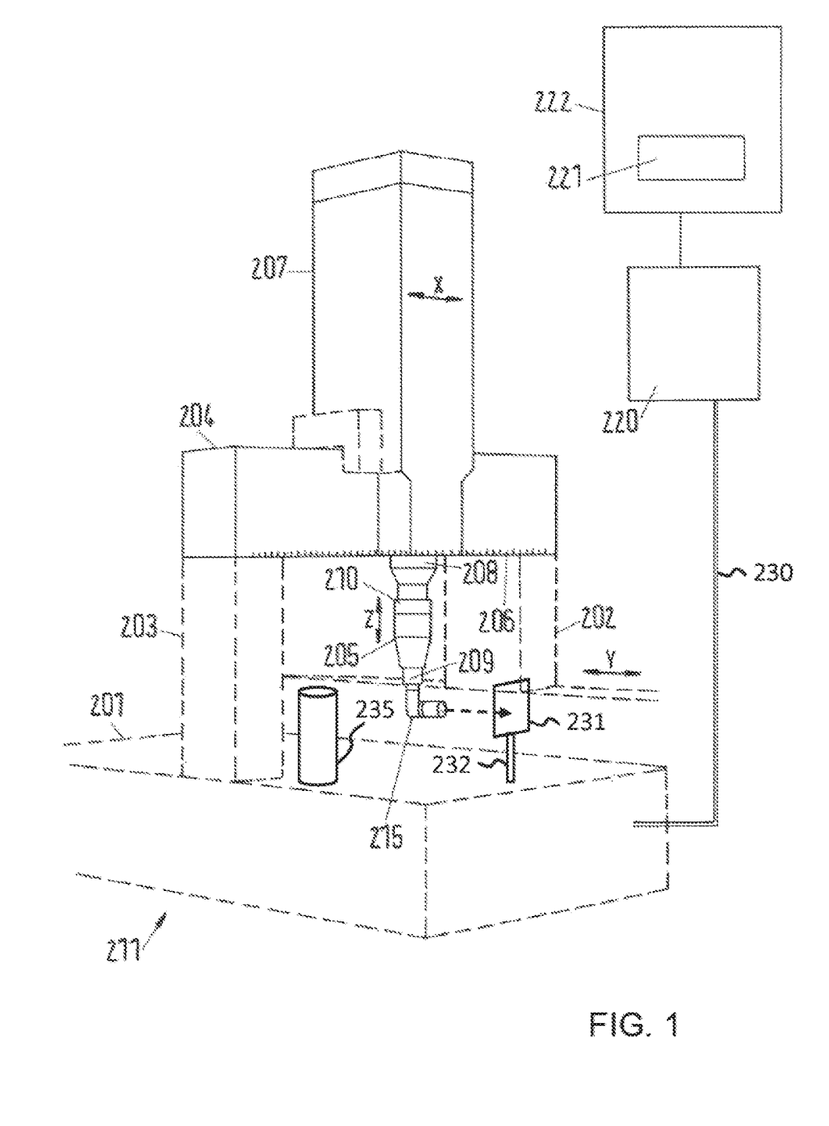
FIG. 1 is a schematic view of a coordinate measuring machine with a portal design in which a white light sensor that is oriented toward a reference body is coupled to the quill.
Figure 2:
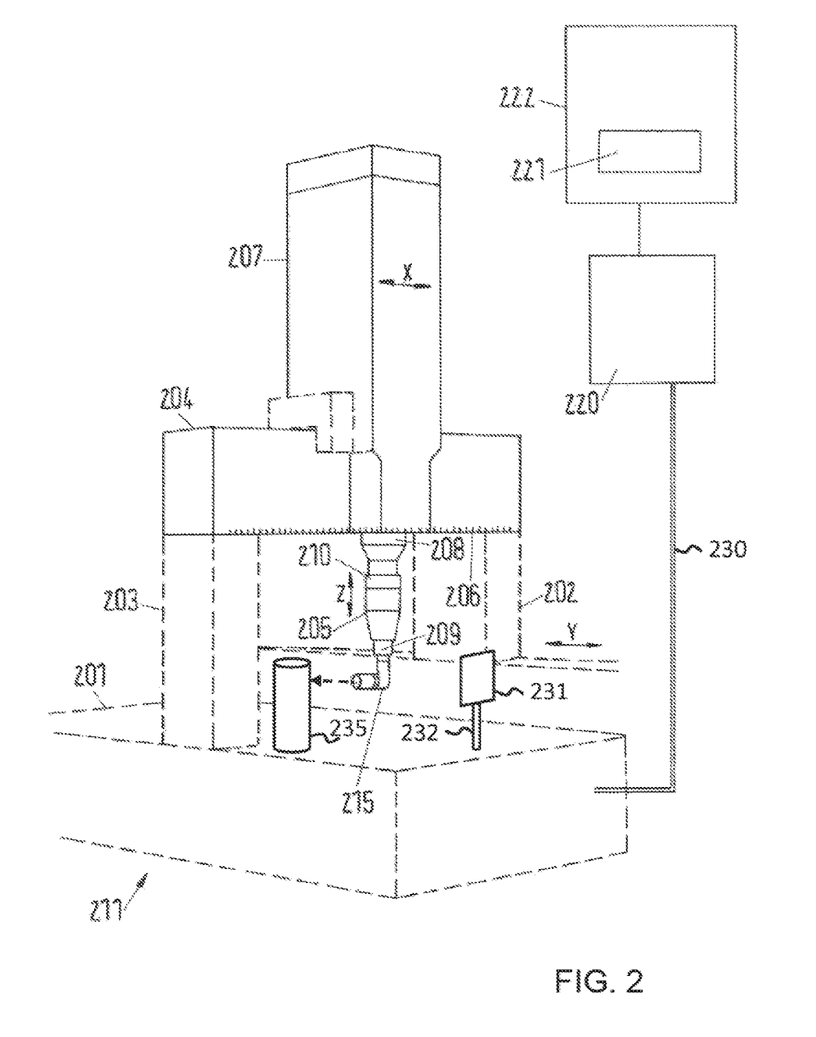
FIG. 2 shows the CMM having the white light sensor shown in FIG. 1, but with a white light sensor that is oriented toward a measurement object that differs from the reference body.

The coordinate measuring machine (CMM) 211 with a portal design, depicted in FIGS. 1 and 2, includes a measurement table 201, above which columns 202, 203 are arranged in a manner movable in the Y-direction of a Cartesian coordinate system. Together with a crossbeam 204, the columns 202, 203 form a portal of the CMM 211. At its opposite ends, the crossbeam 204 is connected to the columns 202 and 203, respectively. Electric motors, which are not depicted in more detail, cause the linear movement of the columns 202, 203 in the Y-direction, along the movement axis that extends in the Y-direction. Here, for example, one electric motor is associated with each one of the two columns 202, 203. The crossbeam 204 is combined with a cross slide 207, which is movable, e.g., by way of air bearings, along the crossbeam 204 in the X-direction of the Cartesian coordinate system. The current position of the cross slide 207 relative to the crossbeam 204 can be determined based on a scale graduation 206. The movement of the cross slide 207 along the movement axis in the X-direction is driven by at least one further electric motor (not illustrated). A quill 208, which is movable in the vertical direction, is mounted on the cross slide 207 and connected at its lower end to an interchange interface 209 by a mounting device 210 and a rotary apparatus 205. A white light sensor 215 is coupled to interchange interface 209 via an angled holder. Due to the angulation, the measurement direction of the white light sensor is approximately parallel to the XY plane. The interchange interface 209 can be moved relative to the cross slide 207 in the Z-direction, along the Z movement axis, of the Cartesian coordinate system, by way of being driven by a further electric motor. The white light sensor that is coupled to the interchange interface 209 can be brought into virtually any position in the region below the crossbeam 204 by way of the electric motors of the CMM. Furthermore, the rotary apparatus 205 can rotate the white light sensor 215 about the Z-axis such that the white light sensor 215 can be oriented in different directions. Alternatively, rather than the rotary apparatus 205, a rotary apparatus that permits other degrees of freedom of movement, e.g., additional rotational movability about a rotational axis that extends perpendicular to the vertical (Z-direction), can be used.

Further depicted is an evaluation device 220 which receives the measurement signals from the white light sensor via a schematically depicted connection 230. The connection 230 can be, for example, a light guidance means such as a fiber-optic cable. Unlike the illustrations in FIG. 1 and FIG. 2, the connection 230 can be connected directly to the white light sensor 215.

A controller 222 of the CMM 211 is schematically illustrated in FIG. 1 and FIG. 2, which controls the drives (e.g., the above-mentioned electric motors). In particular, the controller 222 is able to displace the white light sensor 215 into a desired position by controlling the drives and also to actuate the rotary apparatus 205 to orient the white light sensor 215 in a desired measurement direction.

The controller 222 is further combined with a data memory 221, in which information concerning a relationship between measurement signals of the confocal white light sensor and an actual distance of the white light sensor to a measurement object is stored. This information will be referred to below as "linearization parameter," even though the term linearization parameter designates merely a special type of such information. Alternatively or additionally, information of a different type than linearization parameters concerning the relationship between the measurement signals of the white light sensor and the actual distance of the white light sensor to a measurement object can be stored in the data memory. In any case, the stored information is respectively assigned to a specific white light sensor, i.e., separate pieces of information, to which reference will be made below with the term linearization parameters, are also assigned to white light sensors of the same type.

During operation of confocal white light sensors, a linearization of the sensor measurement signals with respect to the actual distance of the sensor to the measurement object is typically performed. Performing a reference measurement at the site of the manufacturer of the sensor or in a certified measurement laboratory is known. During linearization, value pairs are recorded, including in each case a sensor signal or a plurality of sensor signals and the associated distance measurement value of an additional distance measurement system. The linearization is performed by utilizing a model that describes the behavior of the white light sensor in dependence on the object distance. The model can be, e.g., a mathematical model, for example with polynomials and/or splines that describe the behavior. Alternatively or additionally, it can be a physical model that describes, e.g., the function of the focusing optical unit of the sensor. The result of the linearization is typically stored in the data memory of a control unit of the white light sensor system. Control unit and sensor are supplied together to the user.

FIG. 1 and FIG. 2 illustrate an exemplary embodiment of the arrangement of a coordinate measuring machine with a portal design and a white light sensor. With reference to these figures, an exemplary embodiment of a method is also described. In contrast to the linearization at the site of the manufacturer or in the test laboratory, a reference measurement using a coordinate measuring machine is performed, while the white light sensor is coupled to the CMM. In the exemplary embodiment shown in FIG. 1 and FIG. 2, the white light sensor 215 is coupled to the quill 208 via the interchange interface 209. A reference body 231 is located on the measurement table 201, e.g., a plane-parallel glass pane, wherein the reference body 231 is supported on the measurement table 201 by a support 232. In the exemplary embodiment, the reference body 231 remains stationary relative to the measurement table 201 during the reference measurement. In contrast, the white light sensor 215 is brought into different positions relative to the measurement table 201 and thus also relative to the reference body 231 preferably only by moving the columns 202, 203 in the Y-direction. FIG. 1 illustrates the white light sensor 215 in one of these relative positions. A dashed arrow indicates that the white light sensor 215 is oriented toward the reference body 231. In each relative position, the sensor 215 radiates its measurement radiation onto the reference body 231, the measurement radiation is reflected at least at the front side facing the sensor 215, and the measurement radiation that is back-reflected onto the sensor 215 is captured thereby.

In addition, the position of the white light sensor 215 is ascertained for each of the relative positions from the position measurement system of the CMM 211. Before or, alternatively, after the reference measurement, the position of the reference body 231 with respect to the measurement table 201 or with respect to a different reference location in the coordinate system of the CMM 211 is ascertained. Before or after the coupled state of the sensor 215 to the quill 208 illustrated in FIG. 1, it is possible, e.g., for another sensor (e.g., a tactile probe) to be coupled to the quill 208. The tactile probe is then used to probe the surface of the reference body 231 and to ascertain in this way the exact position at least with respect to the Y-direction and typically also with respect to the X- and Z-directions.

The controller 222 receives the results of the position determination from the position measurement system of the CMM 211 by a signal line (not illustrated), both during the reference measurement and optionally also during the probing by way of a tactile probe or during scanning by another sensor that is coupled to the CMM 211. In addition, the evaluation device 220 receives the measurement signals of the sensor 215 during the reference measurement. By way of example, both the results of the position measurement and the measurement signals of the sensor 215 (or signals that have been processed further based thereon) can be provided with additional information that permits an assignment of the position measurement results to the measurement signals of the sensor 215 or to the signals that have been processed further. One example is a sequential numbering of the value pairs or the addition of a timestamp that represents the measurement time.

Based on the measurement data that have been recorded during the reference measurement and were obtained from the measurement signals of the sensor 215 and from the position measurement system of the CMM 211, the evaluation device 220 or the controller 222 ascertains the relationship between measurement signals of the confocal white light sensor and the actual distance of the white light sensor to a measurement object for the operating state of the white light sensor system that exists when the white light sensor 215 is coupled to the CMM. The linearization parameters, i.e., the results of this relationship, are stored in the data memory 221, preferably with additional information that uniquely designates the associated white light sensor 215 for which the reference measurement was performed.

During a later measurement operation of the CMM 211, which is illustrated in FIG. 2, a measurement object 235 is measured with the white light sensor 215 that is coupled to the quill 208. The sensor 215 measures at least a distance of a surface point of the measurement object 235, and the position measurement system of the CMM 211 ascertains the associated position and orientation of the sensor 215, e.g., in a coordinate system of the CMM 211 that is stationary with respect to the measurement table 201. The distance to the measurement object 235 measured by the sensor 215 is ascertained here by the evaluation device 220, which generates at least one distance measurement value from the measurement signals of the sensor 215 using the linearization parameters that are stored in the data memory 221. This at least one measurement value is then transferred from the evaluation device 220 to the controller 222, which also receives the position measurement values of the position measurement system of the CMM 211 and calculates therefrom coordinates of the surface of the measurement object 235.

Due to the performance of the reference measurement on a CMM that also measures at least one measurement object that differs from the reference body, the entire system in particular no longer needs to be transported to the manufacturer or to a test laboratory and no additional reference measurement needs to be performed after the replacement of the defective component to determine the linearization parameters if a component of the white light sensor system (including, e.g., the white light sensor, the light guide and the evaluation device) is defective. Due to the reference measurement being performed on the same CMM as is used in the actual measurement of measurement objects (in particular workpieces), the accuracy of the position measurement system is additionally adapted to the accuracy of the later measurement of workpieces. Firstly, it is possible to perform measurements with the same accuracy as in the later (or even earlier) measurement of a measurement object by the position measurement system of the CMM, or even with a somewhat higher accuracy. Secondly, the reference measurement also requires merely the accuracy or resolution of the position measurement that is required in the measurement of the measurement objects.

Numerous modifications can be made with respect to the exemplary embodiment described with reference to FIG. 1 and FIG. 2. In particular, the white light sensor can be oriented in a different direction toward a reference body positioned there so as to perform the reference measurement. Alternatively or additionally, the data memory can be part of the evaluation device of the sensor system. As a further alternative, the evaluation device can be integrated in the controller of the CMM. Further exemplary embodiments already have been discussed before the description of the figures.

Figure 3:
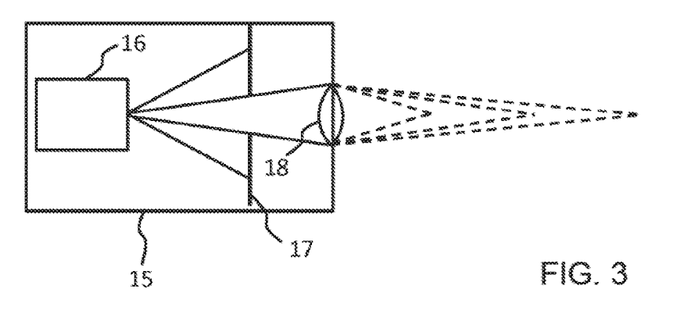
FIG. 3 is a schematic side view of a white light sensor.

FIG. 3 shows an operating principle of a white light sensor 15 in a simplified way. A light source 16 produces measurement radiation that is emitted in the direction of a pinhole 17. The part of the measurement radiation that passes through the pinhole 17, i.e., the radiation that is actually used for the measurement of the distance to a measurement object, is incident on a focusing optical unit 18, which is shown in a simplified illustration in FIG. 3 as a converging lens. Due to the chromatic aberration, the radiation components of the measurement radiation having different wavelengths are focused at different distances to the focusing optical unit. This is indicated by converging dashed lines for three foci in FIG. 3 on the right. If a measurement object is located in one of the foci, the corresponding reflected radiation is reflected back with maximum intensity to the white light sensor 15. The radiation that is reflected back is not illustrated in FIG. 3.

Figure 4:
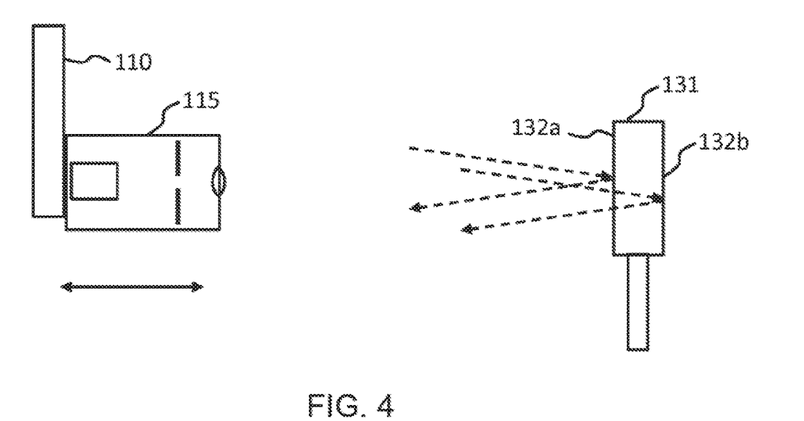
FIG. 4 is a schematic illustration of an arrangement having a white light sensor that is coupled to a sensor carrier of a CMM and a reference body connected to the CMM.

The white light sensor 115 illustrated schematically in FIG. 4 is, e.g., set up like the one illustrated in FIG. 3.

However, it is attached to a sensor carrier 110 of a coordinate measuring machine, e.g., via an interchange interface that is not further illustrated. The white light sensor 115 radiates measurement radiation onto a reference body 131 which is, e.g., a plane-parallel glass body, i.e., having planar surfaces 132a, 132b that are parallel with respect to one another. A part of the radiated measurement radiation is reflected at each of said surfaces 132 back in the direction of the white light sensor 115, as is indicated in FIG. 4 by dashed arrows for two radiation paths. If each of the surfaces 132a, 132b is located at a focus distance in accordance with an associated wavelength of the measurement radiation, it is possible for the white light sensor or the evaluation device thereof to ascertain the distances of the surfaces 132 to the sensor 115 based on the reflected radiation. As is indicated at the bottom left in FIG. 4 by a double arrow, the position of the sensor 115 relative to the reference body 131 can be changed. For this reason, it is possible to ascertain in one reference measurement in each case one pair of distance measurement signals of the sensor 115 for different distances of the sensor 115 to the reference body 131 and, by a separate position measurement system (not illustrated in FIG. 4), the associated distance or at least the position of the sensor 115. The simultaneous ascertainment of the distance of the surfaces 132a, 132b from the sensor 115 also permits the determination of the thickness of the reference body 131.

Figure 5:
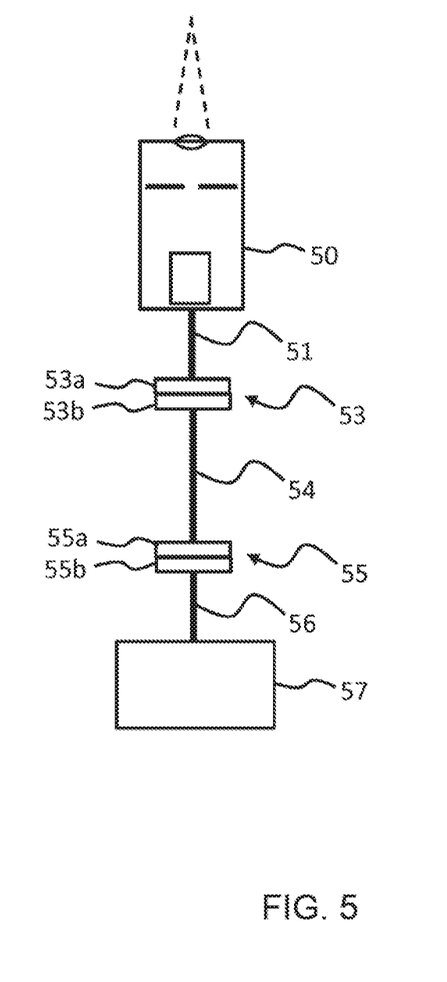
FIG. 5 is a schematic illustration of an exemplary embodiment for a connection between a confocal white light sensor and an evaluation device for evaluating the measurement signals of the confocal white light sensor.

The confocal white light sensor 50 illustrated in FIG. 5 can be, e.g., the white light sensor 215 illustrated in FIG. 1 and FIG. 2, the white light sensor 15 illustrated in FIG. 3, or the white light sensor 115 illustrated in FIG. 4. The white light sensor 50 is connected to an evaluation device 57 via a light-guiding connection that transmits the measurement radiation between the white light sensor 50 and the evaluation device 57. As is the case, e.g., in fiber-optic lines, sections of the light guidance can also be curved, which is not illustrated in FIG. 5, and still guide radiation along the line.

In the illustrated exemplary embodiment, the light guidance has three sections 51, 54, 56. The first section 51 is connected to the white light sensor 50, e.g., via a plug connection that is not illustrated. At the opposite end, the first section 51 is connected to the next, second section 54 via a plug connection 53. A first part 53a of the plug connection 53 can here be connected fixedly to the first section 51, and a second part 53b of the plug connection 53 can be connected fixedly to the second section 54. In this way, the first part 53a and the second part 53b can be plugged together create the light-guiding connection via the first section and the second section 54. Said plug connection 53 also permits the separation of the first part 53a and the second part 53b, with the result that, e.g., a light guide section other than the second section 54 can be connected to the first section 51.

A further plug connection 55 with a first part 55a and with a second part 55b is provided between the second section 54 and a third section 56 of the light guidance. The further plug connection 55 can have the same properties as the plug connection 53. The opposite end of the third section 56 is connected to the evaluation device 57, e.g., via a plug connection (not illustrated).

Radiation can be reflected at the connections and thus at the interfaces of the sections 51, 54, 56 with one another, of the first section 51 with the white light sensor 50, and of the third section 56 with the evaluation device 57. This results in a decrease of the radiation intensity of the radiation that is received by the evaluation device 57 during the operation of the white light sensor. However, this also has the effect that the evaluation device 57 receives radiation via the light guidance even when the white light sensor 50 receives no radiation that is reflected back by a measurement object. This radiation component can therefore be ascertained by a measurement in which the optical unit of the white light sensor 50 is darkened at its radiation entrance opening with the result that no radiation can enter the white light sensor 50 through the opening. In particular the second section 54 can permit a movability of the white light sensor relative to the quill end of a CMM. If the second section is damaged during operation, it can be replaced.

The dark correction value that has been ascertained in this way can be used as a valid correction value during operation of the white light sensor 50 for measuring the distance to a real measurement object until the light guidance is changed. By way of example, if an additional section of light guidance is added or a section, e.g., the second section 54 is replaced, the dark correction value changes. The dark correction value is therefore ascertained in another dark correction measurement. In addition, the information relating to the relationship between measurement signals of the white light sensor and the actual distance of the white light sensor to a measurement object is obtained again with the changed light guidance by performing corresponding measurements of the distance to a reference body.

Since the measurement is performed with the same coordinate measuring machine with which the measurement of the distance to the actual measurement object takes place at a later, the same, and/or earlier time, the complexity for obtaining the relationship between the measurement signals of the confocal white light sensor and the actual distance to a measurement object is reduced. Until now, the corresponding calibration including the systematic errors of the light guidance has traditionally been performed in a special test laboratory. However, it has not been possible therewith to take into account the entire systematic error that actually arises during the operation of the coordinate measuring machine, because the light guidance in a test laboratory is not exactly the same as the light guidance used in practice during the operation of the coordinate measuring machine.

It is understood that the foregoing description is that of the exemplary embodiments of the invention and that various changes and modifications may be made thereto without departing from the spirit and scope of the invention as defined in the appended claims.

What is claimed is:

1. A method for operating a confocal white light sensor on a coordinate measuring machine including a sensor carrier configured to couple a coordinate measurement sensor that is movable in a straight movement direction relative to a base of the coordinate measuring machine, the method comprising:
   (a) coupling the confocal white light sensor to the sensor carrier;
   (b) orienting the confocal white light sensor in the straight movement direction toward a reference body, a position of the reference body with respect to the straight movement direction being known or ascertained;
   (c) moving the sensor carrier with the confocal white light sensor coupled thereto and the reference body relative to one another in the straight movement direction, and generating a measurement signal corresponding to a distance between the confocal white light sensor and the reference body at different movement positions by the confocal white light sensor, the measurement signal representing an intensity distribution of light reflected by the reference body and received by the confocal white light sensor over a wavelength range of measurement radiation of the confocal white light sensor, and ascertaining the movement position with respect to the straight movement direction by a position measurement system of the coordinate measuring machine;

(d) obtaining information relating to a relationship between measurement signals of the confocal white light sensor and an actual distance of the confocal white light sensor to a measurement object based on the generated measurement signal and ascertained movement positions;

(e) generating at least one measurement signal of an object distance to a measurement object to be measured by the coordinate measuring machine by the confocal white light sensor coupled to the sensor carrier, the measurement object to be measured not being the reference body; and (f) generating a measurement value of the object distance from the at least one measurement signal of the object distance based on position measurement values obtained by the position measurement system and the information relating to the relationship.

2. The method as claimed in claim 1, wherein:
the information relating to the relationship between measurement signals of the confocal white light sensor and the actual distance of the white light sensor to a measurement object includes linearization parameters, and
for a varying object distance, with the linearization parameters, function values of a linear mathematical function of the measurement value are determined depending on the object distance from measurement signals of the confocal white light sensor.

3. The method as claimed in claim 1, further comprising:
storing the information relating to the relationship between the measurement signals of the confocal white light sensor and the actual distance of the white light sensor to the measurement object in a data memory to which an evaluation device that is connected to the confocal white light sensor has access, and
wherein the evaluation device receives the measurement signal of the object distance and generates therefrom the measurement value of the object distance.

4. The method as claimed in claim 1, wherein the information relating to the relationship between the measurement signals of the confocal white light sensor and the actual distance of the confocal white light sensor to the measurement object includes information about effects of systematic errors during a signal transmission of the measurement signals of the confocal white light sensor to an evaluation device.

5. The method as claimed in claim 1, wherein:
the sensor carrier includes a sensor interface via which a plurality of different confocal white light sensors is coupled to the sensor carrier, and
at least the steps (a) to (e) are performed for each of the plurality of different confocal white light sensors successively coupled to the sensor carrier.

6. The method as claimed in claim 5, wherein:
each of the plurality of different confocal white light sensors includes an interface configured to connect the confocal white light sensor to the sensor interface of the sensor carrier,
each of the plurality of confocal white light sensors has an individual identification feature that is automatically capturable by at least one of a controller of the coordinate measuring machine and the confocal white light sensor and that distinguishes the confocal white light sensor from other confocal white light sensors, and
the controller is configured to capture the individual identification feature of the confocal white light sensor that is coupled to the sensor interface of the sensor carrier and to assign to the confocal white light sensor that is coupled thereto the information relating to the relationship between the measurement signals of the confocal white light sensor and the actual distance of the white light sensor to the measurement object that was obtained for the coupled confocal white light sensor.

7. The method as claimed in claim 1, further comprising:
in step (c), generating the measurement signals of at least two different distances of the confocal white light sensor to at least two different surface regions of the reference body by the confocal white light sensor at different movement positions of the confocal white light sensor relative to the reference body; and
in step (d), obtaining the information relating to the relationship between measurement the signals of the confocal white light sensor and the actual distance of the white light sensor to the measurement object based on the generated measurement signals of the at least two different distances and based on the ascertained movement positions.

8. The method as claimed in claim 1, wherein:
in step (a), the confocal white light sensor is connected to an evaluation device via a connection including a light guidance for evaluating the distance from the generated measurement signals of the distance, and
the connection is not changed between steps (c) and (e).

9. The method as claimed in claim 1, wherein the position measurement system of the coordinate measuring machine determines the movement position based on a scale graduation.

10. An arrangement comprising:
a confocal white light sensor;
a coordinate measuring machine including a sensor carrier configured to couple a coordinate measurement sensor to the coordinate measuring machine, the coordinate measurement sensor being movable in a straight movement direction relative to a base of the coordinate measuring machine;
the confocal white light sensor being coupled to the sensor carrier and oriented in the straight movement direction toward a reference body;
the coordinate measuring machine including a controller configured to move the confocal white light sensor and the reference body in the straight movement direction relative to one another to different movement positions;
the coordinate measuring machine including a position measurement system configured to ascertain a movement position with respect to the straight movement direction;
the confocal white light sensor being configured to generate in each of the different movement positions a measurement signal corresponding to a distance between the confocal white light sensor and the reference body, the measurement signal representing an intensity distribution of light reflected by the reference body and received by the confocal white light sensor over a wavelength range of measurement radiation of the confocal white light sensor;
an evaluation device configured to obtain information relating to a relationship between measurement signals of the confocal white light sensor and an actual distance of the white light sensor to a measurement object based on the generated measurement signals of the distance between the confocal white light sensor and the reference body and based on ascertained movement positions, at least one of the evaluation device and the controller of the coordinate measuring machine being configured to generate a measurement value of the object distance from at least one measurement signal of the confocal white light sensor that is coupled to the sensor carrier based on position measurement values obtained by the position measurement system and the obtained information relating to the relationship, the measurement signal corresponding to an object distance between the confocal white light sensor and a measurement object to be measured by the coordinate measuring machine; and the measurement object to be measured not being the reference body.

11. The arrangement as claimed in claim 10, further comprising:

a control unit configured to control an operation of the confocal white light sensor, the control unit including the evaluation device.

12. The arrangement as claimed in claim 10, further comprising:

a plurality of different confocal white light sensors, and wherein the sensor carrier includes a sensor interface via which confocal white light sensors of the plurality of different confocal white light sensors are coupled to the sensor carrier.

13. The arrangement as claimed in claim 12, wherein:

each of the plurality of different confocal white light sensors includes an interface configured to connect the confocal white light sensor to the sensor interface of the sensor carrier, each of the different confocal white light sensors has an individual identification feature that is automatically capturable by at least one of a controller of the coordinate measuring machine and the white light sensor and that distinguishes the confocal white light sensor from other confocal white light sensors, and the controller is configured to capture the individual identification feature of the confocal white light sensor that is coupled to the sensor interface of the sensor carrier and to assign to the confocal white light sensor that is coupled thereto the information relating to the relationship between the measurement signals of the confocal white light sensor and an actual distance of the white light sensor to the measurement object that was obtained for the coupled confocal white light sensor.

14. The arrangement as claimed in claim 10, wherein the position measurement system of the coordinate measuring machine includes a scale graduation based on which position measurement system determines the movement position.

* * * * *